United States Patent [19]

Statz

[11] 4,387,188
[45] Jun. 7, 1983

[54] MOLDING RESINS BASED ON BLENDS OF ACID COPOLYMER/LINEAR POLYOLEFIN/REINFORCING FIBER

[75] Inventor: Robert J. Statz, Kennett Square, Pa.

[73] Assignee: E. I. Du Pont de Nemours and Company, Wilmington, Del.

[21] Appl. No.: 236,718

[22] Filed: Feb. 23, 1981

[51] Int. Cl.³ .................... C08K 3/40; C08K 3/20; C08K 3/04; C08F 220/06
[52] U.S. Cl. .................... 524/494; 524/35; 524/424; 524/430; 524/504; 524/521; 524/522; 525/72; 525/78; 525/221
[58] Field of Search ............ 525/221, 72, 78; 260/42.14, 42.17, 42.18, 42.46; 524/35, 424, 430, 494, 504, 521, 522

[56] References Cited

U.S. PATENT DOCUMENTS

| | | | |
|---|---|---|---|
| 3,264,272 | 8/1966 | Rees | 525/326 |
| 3,313,545 | 4/1967 | Bartsch | 260/42.18 |
| 3,344,014 | 9/1967 | Rees | 428/441 |
| 3,437,718 | 4/1969 | Rees | 525/221 |
| 3,520,861 | 7/1970 | Thomson et al. | 428/500 |
| 3,819,768 | 6/1974 | Molitor | 525/221 |
| 3,856,724 | 12/1974 | O'Connor et al. | 260/42.14 |
| 3,940,146 | 2/1976 | Little | 260/42.29 |
| 4,026,967 | 5/1977 | Flexman et al. | 525/288 |
| 4,169,599 | 10/1979 | Fujio et al. | 260/42.47 |

FOREIGN PATENT DOCUMENTS

| | | | |
|---|---|---|---|
| 4934467 | 9/1974 | Japan | 525/78 |
| 7900503 | 7/1980 | Netherlands | 525/78 |
| 2026900 | 2/1980 | United Kingdom | . |

OTHER PUBLICATIONS

Derwent Abst. 49011, (J55071733), Ashai Dow, "Stress Cracking Resistant Polyethylene Compsns.", 5-30-80.
Derwent Abst. 70379, C/40, (J55108432), 8-20-80, "Polyolefin Synthetic Resin Aq. Dispersion Compsn . . . ", Mitsui Petro.
Derwent Abst. 40654, c/23, (J55056361), 4-25-80, Matsushita Elec., "Battery . . . ".
Derwent Abst. 85287, C/48, (J55133440), DJK Int, "Golf Ball . . . ", 10-17-80.

Primary Examiner—John C. Bleutge
Assistant Examiner—Herbert J. Lilling

[57] ABSTRACT

Blends of linear polyolefin, reinforcing fiber, and acid copolymer of α-olefin and α,β-ethylenically unsaturated carboxylic acid are provided wherein the acid copolymer has from 0 to about 90 percent of the acid groups ionized by neutralization with metal ions. Such blends having high heat distortion temperature, excellent Izod impact values and fast molding cycles are particularly suitable as molding resins.

10 Claims, No Drawings

MOLDING RESINS BASED ON BLENDS OF ACID COPOLYMER/LINEAR POLYOLEFIN/REINFORCING FIBER

BACKGROUND OF THE INVENTION

1. Field of the Invention

This invention relates to molding resins and more specifically it relates to molding resins based on acid copolymer/linear polyolefin/reinforcing fiber blends.

2. Description of the Prior Art

Copolymers of ethylene and methacrylic acid partially neutralized with sodium or zinc ions are tough molding resins with a combination of good tensile properties and excellent abrasion resistance. Their greatest deficiency is their low softening point which is displayed by a low heat deflection temperature (HDT). The low heat deflection temperature causes parts molded from ionomers to sag and warp when exposed to temperatures much above 40°–50° C.

Ionomers are routinely blended with glass fibers to give composites with higher heat deflection temperatures. However, large amounts of glass are needed to obtain significant increase in HDT's and these materials do not retain their toughness.

Glass reinforced linear high density polyethylene (HDPE) has a high heat distortion temperature but a low Izod impact strength.

Blends of HDPE with ionomers do not have significantly improved HDT values and the blends have a tendency to be incompatible and delaminate on injection molding.

U.S. Pat. No. 3,856,724 discloses reinforced thermoplastic compositions based upon a reinforcing agent such as glass fiber or alpha cellulose with a polyolefin such as polyethylene, polypropylene, polyisobutylene, etc. and a minor amount of an ionic hydrocarbon copolymer, such as an ethylene-methacrylic acid copolymer which has been reacted with an ionizable metal compound. It is disclosed that generally, the amount of the ionic hydrocarbon copolymer will be from about 0.05 to about 35 percent by weight and, preferably, from about 1 to about 30 percent by weight based on the weight of the reinforced thermoplastic composition.

SUMMARY OF THE INVENTION

According to the present invention there is provided a composition consisting essentially of (a) from about 38 to about 90 percent by weight of acid copolymer selected from the group consisting of direct copolymers and graft copolymers wherein (A) said direct copolymer is the copolymer of α-olefin having the formula R—CH=CH$_2$, where R is a radical selected from the class consisting of hydrogen and alkyl radicals having from 1 to 8 carbon atoms, and α,β-ethylenically unsaturated carboxylic acid having from 3 to 8 carbon atoms, the acid moieties being randomly or nonrandomly distributed in the polymer chain, (1) the α-olefin content of the copolymer being at least 50 mole percent, based on the α-olefin-acid copolymer, (2) the unsaturated carboxylic acid content of the copolymer being from about 0.2 to about 25 mole percent, based on the α-olefin-acid copolymer, and (3) any other monomer component optionally copolymerized in said copolymer being monoethylenically unsaturated, and (B) said graft copolymer being obtained by grafting 0.1 to 5 percent by weight of α,β-unsaturated carboxylic acid having 3 to 8 carbon atoms or an unsaturated carboxylic acid anhydride onto a preformed polyolefin backbone derived from ethylene or ethylene and C$_3$ to C$_8$ α-olefin, in which polyolefin backbone any other optionally copolymerized monomer component is monoethylenically unsaturated, said direct or graft acid copolymers having from 0 to about 90% of the carboxylic acid groups ionized by neutralization with metal ions, said ionic copolymers having solid state properties characteristic of crosslinked polymers and melt fabricability properties characteristic of uncrosslinked thermoplastic polymers, (b) from about 5 to about 60 percent by weight of linear polymer of α-olefin having the formula R—CH=CH$_2$, where R is a radical selected from the class consisting of hydrogen and alkyl radicals having from 1 to 8 carbon atoms, and (c) from about 2 to about 50 percent by weight of at least one reinforcing fiber selected from the group consisting of glass fiber, natural mineral fiber, man made mineral fiber and high modulus organic fiber.

As used herein, the term "consisting essentially of" means that the named ingredients are essential, however, other ingredients which do not prevent the advantages of the present invention from being realized can also be included.

DETAILED DESCRIPTION OF THE INVENTION

Surprisingly, it was found that three component blends of acid copolymer/linear polyolefin/reinforcing fiber have the best combination of properties. These blends have high heat distortion temperatures, excellent Izod impact values, and they do not delaminate under injection molding conditions. In addition these blends can be molded applying a faster molding cycle than normally used with ionomer parts.

Acid copolymers suitable for the present invention are selected from the group consisting of direct copolymers and graft copolymers wherein (A) said direct copolymer is the copolymer of α-olefin having the formula R—CH=CH$_2$, where R is a radical selected from the class consisting of hydrogen and alkyl radicals having from 1 to 8 carbon atoms, and α,β-ethylenically unsaturated carboxylic acid having from 3 to 8 carbon atoms, the acid moieties being randomly or nonrandomly distributed in the polymer chain, (1) the α-olefin content of the copolymer being at least 50 mole percent, based on the α-olefin-acid copolymer, (2) the unsaturated carboxylic acid content of the copolymer being from about 0.2 to about 25 mole percent, based on the α-olefin-acid copolymer, and (3) any other monomer component optionally copolymerized in said copolymer being monoethylenically unsaturated, and (B) said graft copolymer being obtained by grafting 0.1 to 5 percent by weight of α,β-unsaturated carboxylic acid having 3 to 8 carbon atoms or an unsaturated carboxylic acid anhydride onto a preformed polyolefin backbone derived from ethylene or ethylene and C$_3$ to C$_8$ α-olefin, in which polyolefin backbone any other optionally copolymerized monomer component is monoethylenically unsaturated, said direct or graft acid copolymers having from 0 to about 90% of the carboxylic acid groups ionized by neutralization with metal ions, said ionic copolymers having solid state properties characteristic of crosslinked polymers and melt fabricability properties characteristic of uncrosslinked thermoplastic polymers. The acid copolymers are described in U.S. Pat. No. 3,520,861; U.S. Pat. No. 4,026,967; U.S. Pat.

4,252,924; and U.S. Pat. No. 4,248,990. The ionic copolymers are described in U.S. Pat. No. 3,264,272. Acid copolymers can also be derived by reacting α-olefin polymers with unsaturated acids. Hence, polyolefins or olefin copolymers can be reacted with α,β-unsaturated acids either thermally or by using a peroxide catalyst to give acid functionalized graft copolymers. These polymers can be used in place of or in conjunction with the directly copolymerized acid copolymers or they can be partially neutralized to give materials which can be used in place of or in conjunction with the directly copolymerized acid copolymers or their ionomers.

The acid copolymers generally are present in the amount of from about 38 to about 90 percent by weight in the reinforced compositions of the present invention. Preferably the acid copolymer is present in the amount of from about 40 to about 75 percent and most preferably from about 45 to about 55 weight percent.

Higher levels of acid copolymers are preferred because they result in greater resistance to Gardner impact and improved Izod impact strength at low temperatures ($-30°$ to $-40°$ C.).

Experiments have demonstrated that zinc ionomers are superior to sodium ionomers. An ionomer containing 11 weight percent (3.87 mole %) methacrylic acid and 89 weight percent (96.13 mole %) ethylene neutralized 57 percent with zinc ions and having a final melt index of 5 g/10 min, and an ionomer containing 10 weight percent (3.5 mole %) methacrylic acid neutralized to a 71 percent level with zinc and having an MI of 1.1 g/10 min appear to have the best combination of properties in the preferred blends. In addition acid copolymers containing no metal ions appear to work equally well in these systems.

Ionomers or acid copolymers containing higher levels of acid i.e., 12 and 15 percent by weight (4.25 to 5.43 mole %) do not give HDT values in the blends as high as the lower acid polymers.

Acid copolymers containing 3 to 11 weight percent (1–3.87 mole %) methacrylic acid and neutralized 0–80 percent with zinc ions appear to be the most effective materials in this blend.

Preferably the α,β-ethylenically unsaturated acid is acrylic acid or methacrylic acid and most preferably it is methacrylic acid. The ionic copolymer is preferably neutralized to the extent of from about 5 to about 80 percent and most preferably from about 15 to about 75 percent. The α-olefin content of the copolymer is preferably at least about 88 mole percent, based on the α-olefin-acid copolymer and most preferably it is at least about 95 mole percent. The unsaturated carboxylic acid content of the copolymer is preferably from about 1 to about 12 mole percent and most preferably from about 1 to about 4 mole percent, based on the α-olefin-acid copolymer.

The metal ions are preferably selected from the group consisting of sodium, potassium, calcium, magnesium, zinc and strontium, and most preferably the metal ion is zinc.

The linear polymer of α-olefin suitable in the blends of the present invention is a homo- or copolymer of α-olefins having the formula $R-CH=CH_2$, where R is a radical selected from the group consisting of hydrogen and alkyl radicals having from 1 to 8 carbon atoms. Preferably the linear polyolefin is selected from the group consisting of polyethylene, polypropylene, polybutene-1, poly-4-methyl pentene-1, and copolymers thereof and most preferably the linear polyolefin is polyethylene.

When polyethylene is the linear polyolefin in the blends of the present invention it has generally a density of from about 0.91–0.97, preferably from about 0.935 to about 0.970 and most preferably from about 0.95 to about 0.97. The melt index of the linear polyethylene is generally from about 0.1 to about 100, preferably from about 0.2 to about 5 and most preferably from about 0.3 to about 3. Linear homopolymers of ethylene, such as a 3 MI narrow molecular distribution resin, appear to give adequate toughness and heat deflection temperatures. However, if higher toughness is needed, a medium molecular weight distribution homopolymer with a 0.45 melt index can be used. Such materials will reduce the melt flow of the final blend.

Blends containing linear copolymers appear to have reduced heat deflection temperatures but should have increased toughness.

Generally, from about 5 to about 60 percent by weight of linear polyolefin is used in the blends of the present invention. Preferably the amount is from about 10 to about 55 percent by weight and most preferably it is from about 27 to about 43 percent by weight.

The third essential ingredient of the blends of the present invention is the reinforcing fiber which can be selected from the group consisting of glass fibers, natural mineral fibers, man-made, manufactured mineral fibers (e.g., graphite, aluminum oxide, etc.), and high modulus organic fibers. The reinforcing fibers generally used in thermoplastic materials are subjected to shearing during extrusion and molding, hence their lengths and aspect ratios are reduced. Glass fibers usually range from 0.001 to 0.030 inches in length after compounding, and minerals are usually shorter. Any compounding system which does not lower the lengths or aspect ratios to this degree should give improved properties in the final composite materials. After compounding the reinforcing fibers have an L/D aspect ratio of from about 10 to about 100.

The type of glass or mineral fiber employed does not appear to be critical. However, fibers with high L/D ratios appear to give higher heat deflection temperatures. Commercial glass fibers sold as reinforcing agents for thermoplastics are useful for this application and appear to give better properties than the shorter mineral fibers.

Owen-Corning's fiber glass comes with various types of coatings. Their available products have sizing denoted by the following numbers and are recommended for the listed thermoplastics.

| Sizing | Recommended for Thermoplastics |
| --- | --- |
| 409 | Polycarbonate and Acetal |
| 411 | Nylon |
| 414 | ABS and SAN |
| 415 | HDPE and Polycarbonate |
| 418 | In Polycarbonate at Low Loadings |
| 419 | Thermoplastic Polyester and Nylon |
| 452 | Polypropylene |
| 497 | Polyphenylene Oxide |

Glass OCF-415AA or OCF-415BB and OCF-419BB appear to give the best combination of tensile properties, toughness and heat deflection temperature.

A similar glass from Pittsburgh Plate Glass, PPG-3450, gave good results.

The preferred reinforcing fibers are glass fibers and mineral fibers having an L/D aspect ratio of from about 20 to about 100. Most preferably the reinforcing fiber is glass fiber having an L/D aspect ratio of from about 30 to about 100.

Generally, the amount of the reinforcing fiber is from about 2 to about 50 percent by weight. Preferably the fiber should be present in from about 5 to about 35 percent by weight and most preferably from about 12 to about 18 percent by weight.

The combination of heat deflection temperature, Izod impact strength, flexural modulus, abrasion resistance and tensile properties of the blends of the present invention indicates a material which could be competitive with acrylonitrile, butadiene styrene resins or impact modified polypropylene in applications for injection molded parts such as automobile grills, tool housings, and any other part normally produced from ABS. In addition the polymer blends can be used to prepare extruded sheets for thermoforming applications.

In the above applications, it is customary to add small amounts of pigments or fillers or blowing agents to the other ingredients of the blend. These materials along with mold release agents and lubricants can be added to the polymer blend in amounts that are normally used without adversely affecting the physical properties of the blend.

Tensile strength is determined by ASTM T638, flexural modulus by ASTM 790, notched Izod impact by ASTM D256, heat deflection temperature by ASTM D648.

The following examples serve to illustrate the present invention. All parts, percentages and proportions are by weight unless otherwise indicated.

EXAMPLE 1 AND COMPARATIVE EXAMPLE 1

"Fiberite" RTP-707 (a linear HDPE reinforced with 40 percent glass fiber commercially available from Fiberite Corporation) was blended with an ionomer resin on a two roll mill at 190° C. for 5–10 minutes. The heat deflection temperatures (HDT) at 66 psi (455×10³ Pa) was significantly increased over a control ionomer resin (C-1).

Blends of "an ionomer" (E/10 MAA copolymer, 100 MI, neutralized with zinc ions to a final MI of 5, available from E. I. du Pont de Nemours and Company) and "Fiberite" RTP-707—in a 60/40 ratio—were produced on a twin screw extruder using the following conditions:

| RPM | TEMPERATURES, °C. | | | | | | RATE lb/hr | VAc mm | Melt Pressure psig |
|---|---|---|---|---|---|---|---|---|---|
| | ZONE 1 | ZONE 2 | ZONE 3 | ZONE 4 | ZONE 5 | DIE | | | |
| 100 | 144 | 163 | 180 | 190 | 220 | 202 | 17 | 28.6 | 50 |

The resulting pelletized materials were injection molded using the following conditions:

| | TEMPERATURE, °C. | | | | | INJECTION PRESSURE psi | RAM SPEED | SCREW SPEED rpm |
|---|---|---|---|---|---|---|---|---|
| REAR | CENTER | FRONT | NOZZLE | MELT | MOLD | | | |
| 195 | 195 | 225 | 225 | 234 | 25 | 800 | Fast | 60 |

Composition of the blend and the results of physical tests are summarized in Table I.

TABLE I

| | Ex. 1 | | C-1 | |
|---|---|---|---|---|
| Blend Composition, % | | | | |
| Zinc ionomer of E/10MAA (5 MI) | 60 | | 100 | |
| RTP-707 | 40 | | 0 | |
| MI, g/10 min | 2.3 | | 5.0 | |
| Tensile Strength | | | | |
| Yield, MPa (kpsi) | 24.83 | (3.6) | 12 | (1.7) |
| Break, MPa (kpsi) | 18.8 | (2.7) | 20 | (2.9) |
| % Elongation | 50 | | 322 | |
| Flexural Modulus, MPa (kpsi) | 1390 | (202) | 250 | (37) |
| Heat Deflection Temperature @ 455 × 10³ Pa (66 psi), °C. | 63 | | 47 | |
| Notched Izod Impact Strength | | | | |
| @ 23° C. J/M (ft-lb/in) | 747 | (14) | 694 | (13) |
| @ −20° C. J/M (ft-lb/in) | 480 | (9) | 694 | (13) |

EXAMPLE 2

A blend of HDPE/ionomer resin/glass fiber was prepared using the procedure of Example 1. Composition and results of physical tests are summarized in Table II.

TABLE II

| | Example 2 | |
|---|---|---|
| Blend Composition, % | | |
| Zinc ionomer of E/10MAA (5 MI) | 59 | |
| "Alathon" 7030[1] | 25 | |
| "OCF" 419AA[2] | 17 | |
| Tensile Strength | | |
| Yield, MPa (kpsi) | 27.21 | (3.94) |
| Break, MPa (kpsi) | 26.48 | (3.84) |
| % Elongation | 10.2 | |
| Notched Izod Impact @ 23° C. J/M (ft-lb/in) | 437 | (8.2) |
| Heat Deflection Temperature 455 × 10³ Pa (66 psi), °C. | 71 | |

[1]high density polyethylene, MI 2.8 g/10 min., 0.960 g/cc density, available from E. I. du Pont de Nemours and Company
[2]surface treated glass fiber, 3/16" initial length, 0.000525" diameter, recommended for reinforcement of polyester and nylon, available from Owens Corning.

EXAMPLE 3

Blends of ionomer resin, mineral fiber and high density polyethylene (HDPE) were produced in the same manner as in Example 1. Composition and properties are summarized in Table III.

TABLE III

| | Example 3 | |
|---|---|---|
| Blend Composition, % | | |
| Zinc ionomer of E/10MAA (5 MI) | 50 | |
| "Alathon" 7030 | 25 | |
| "Wollastokup" 1100[1] | 25 | |
| Tensile Strength | | |
| Yield, MPa (kpsi) | 18.6 | (2.7) |
| Break, MPa (kpsi) | 17.2 | (2.50) |

TABLE III-continued

|  | Example 3 |
|---|---|
| % Elongation | 136 |
| Heat Deflection Temperature |  |
| 455 × 10³ Pa (66 psi), °C. | 53 |

[1] Fibrous calcium silicate surface treated with γ-amino propylsilane, available from NYCO a division of Processed Minerals, Inc.

EXAMPLE 4

Blends containing ionomer resin, glass fiber, mineral fiber and HDPE were compounded and injection molded using the conditions of Example 1. Composition and results of physical tests are summarized in Table IV.

TABLE IV

|  | Example 4 | |
|---|---|---|
| Blend Composition, % | | |
| Zinc ionomer of E/10MAA (5 MI) | 57 | |
| "Alathon" 7030 | 23 | |
| "PPG"-3531[1] | 15 | |
| "Wollastokup" 1100 | 5 | |
| Tensile Strength | | |
| Yield, MPa (kpsi) | 21.49 | (3.12) |
| Break, MPa (kpsi) | 12.43 | (1.8) |
| % Elongation | 18.3 | |
| Notched Izod Impact Strength | | |
| J/M (ft-lb/in) | 577 | (10.8) |
| Heat Deflection Temperature | | |
| @ 455 × 10³ Pa (66 psi), °C. | 72 | |

[1] surface treated fiber glass, 3/16" initial length, 0.000375" diameter, available from Pittsburgh Plate Glass.

EXAMPLE 5

Blends of several ethylene-methacrylic acid copolymers, "Dowlex" 2045 a linear low density polyethylene (LLDPE) having a 0.924 g/cm³ density, and a melt index of 1.1 g/10 min available from Dow Chemical Co., and a glass fiber, "PPG" 3540 (¼" initial length, 0.00375" diameter, recommended for nylon molding resins, available from Pittsburgh Plate Glass) were produced using the same extrusion conditions as found in Example 1. These blends were injection molded into samples for testing using the same conditions as Example 1. Compositions and the results of tests are summarized in Table V.

TABLE V

| Example | Acid Copolymer, | (Wt. %) | Polyethylene, | (Wt. %) | Glass Fiber, | (Wt. %) |
|---|---|---|---|---|---|---|
| 5a | Polymer-1[1] | (55) | "Alathon"7030 | (25) | "PPG"3540 | (20) |
| 5b | Polymer-1 | (55) | "Dowlex"2045 | (25) | "PPG"3540 | (20) |
| 5c | Polymer-2[2] | (55) | "Alathon"7030 | (25) | "PPG"3540 | (20) |
| 5d | Polymer-2 | (55) | "Dowlex"2045, | (25) | "PPG"3540 | (20) |

| | Physical Properties | | |
|---|---|---|---|
| Ex. | HDT @ 455 × 10³ Pa °C. | Flex Modulus Pa (kpsi) | Izod Impact J/m (ft-lb/in) |
| 5a | 81 | 12.82 × 10⁵ (186) | 224 (4.2) |
| 5b | 74 | 8.61 × 10⁵ (125) | 592 (11.1) |
| 5c | 89 | 13.17 × 10⁵ (191) | 405 (7.6) |
| 5d | 79 | 8.82 × 10⁵ (128) | 630 (11.8) |

[1] Polymer-1: Ethylene, methacrylic acid copolymer containing 9.3 wt. % methacrylic acid, having a melt index of 3.7 g/10 min.
[2] Polymer-2: Ethylene, methacrylic acid copolymer containing 4.5 wt. % methacrylic acid, having a melt index of 0.80 g/10 min.

I claim:

1. A composition consisting essentially of
   (a) from about 40 to about 75 percent by weight of acid copolymer selected from the group consisting of direct copolymers and graft copolymers wherein,
   (A) said direct copolymer is the copolymer of α-olefin having the formula $R-CH=CH_2$, where R is a radical selected from the class consisting of hydrogen and alkyl radicals having from 1 to 8 carbon atoms and $\alpha,\beta$-ethylenically unsaturated carboxylic acid having from 3 to 8 carbon atoms, the acid moieties being randomly or nonrandomly distributed in the polymer chain, (1) the α-olefin content of the copolymer being at least 50 mole percent, based on the α-olefin-acid copolymer, (2) the unsaturated carboxylic acid content of the copolymer being from about 0.2 to about 25 mole percent, based on the α-olefin-acid copolymer, and (3) any other monomer component optionally copolymerized in said copolymer being monoethylenically unsaturated, and
   (B) said graft copolymer being obtained by grafting 0.1 to 5 percent by weight of $\alpha,\beta$-unsaturated carboxylic acid having 3 to 8 carbon atoms or an unsaturated carboxylic acid anhydride onto a preformed polyolefin backbone derived from ethylene or ethylene and $C_3$ to $C_8$ α-olefin, in which polyolefin backbone any other optionally copolymerized monomer component is monethylenically unsaturated,
   said direct or graft acid copolymers having from 0 to about 90 percent of the carboxylic acid groups ionized by neutralization with metal ions, said ionic copolymers having solid state properties characteristic of crosslinked polymers and melt-fabricability properties characteristic of uncrosslinked thermoplastic polymers,
   (b) from about 5 to about 60 percent by weight of linear polymer of α-olefin having the formula $R-CH=CH_2$, where R is a radical selected from the class consisting of hydrogen and alkyl radicals having from 1 to 8 carbon atoms,
   (c) from about 2 to about 50 percent by weight of at least one reinforcing fiber selected from the group consisting of glass fiber, natural mineral fiber, man made mineral fiber and high modulus organic fiber.

2. The composition of claim 1 wherein the acid copolymer is direct copolymer and is present in an amount of from about 40 to about 75 percent by weight, said copolymer having a melt index of from about 0.1 to about 100 and having from about 5 to about 80 percent of the carboxylic acid groups ionized by neutralization with metal ions selected from the group consisting of sodium, potassium, calcium, magnesium, zinc and strontium, the α-olefin content of the copolymer being at least 88 mole percent, based on the α-olefin-acid copolymer, and the unsaturated carboxylic acid content of the copolymer being from about 1 to about 12 mole percent, based on the α-olefin-acid copolymer, and wherein the reinforcing fiber has an L/D aspect ratio of from about 10 to about 100.

3. The composition of claim 2 wherein the linear polymer of α-olefin is present in an amount of from about 10 to about 55 percent by weight, is selected from the group consisting of polyethylene, polypropylene, polybutene-1, poly-4-methyl pentene-1, and copolymers thereof, and when the linear polyolefin is polyethylene it has a density of from about 0.935 to about 0.970 and a melt index of from about 0.2 to about 5.

4. The composition of claim 3 wherein the reinforcing fiber is present in an amount of from about 5 to about 35 percent by weight and is selected from the group consisting of mineral and glass fibers having an L/D aspect ratio of from about 20 to about 100.

5. The composition of claim 4 wherein the α,β-ethylenically unsaturated carboxylic acid is selected from the group consisting of acrylic acid and methacrylic acid.

6. The composition of claim 5 wherein the acid copolymer is present in an amount of from about 45 to about 55 percent by weight, the α,β-ethylenically unsaturated carboxylic acid is methacrylic acid and is present in the amount of from about 1 to about 4 mole percent, said copolymer having a melt index of from about 0.3 to about 1.5 and having from about 15 to about 75 percent of the carboxylic acid groups ionized by neutralization with zinc ions, the α-olefin is ethylene and is present in the amount of at least about 95 mole percent, based on the α-olefin-acid copolymer.

7. The composition of claim 6 wherein the linear polymer of α-olefins is polyethylene and is present in an amount of from about 27 to about 43 percent by weight, has a density of from about 0.95 to about 0.97 and a melt index of from about 0.3 to about 3.

8. The composition of claim 7 wherein the reinforcing fiber is glass fiber having an L/D aspect ratio of from about 30 to about 100 and is present in an amount of from about 12 to about 18 percent by weight.

9. The composition of claim 1 wherein the acid copolymer is graft copolymer.

10. The composition of claim 9 wherein the acid copolymer is a blend of graft copolymer and direct copolymer.

* * * * *